UNITED STATES PATENT OFFICE 2,420,322

PRESERVING PEELED WHITE POTATOES

Ralph F. Matarazzo, Medford, Mass.

No Drawing. Application December 1, 1943,
Serial No. 512,483

3 Claims. (Cl. 99—193)

This invention relates to the preparation and storage of potatoes for subsequent cooking and is concerned with a process of treating common white potatoes, after peeling, to prevent their discoloration. Heretofore white potatoes have been supplied already peeled, to restaurants and hotels in order to save time and labor in kitchens, and to keep the peeled potatoes from discoloring, after peeling and prior to cooking them, it has been the practice to keep the peeled potatoes submerged in water during transportation and brief storage up to the time when they are to be cooked. This practice necessarily involved the transportation of large volumes of water, the bulk and weight of which about equalled that of the potatoes themselves, and the use of containers usually made of metal.

The present invention avoids the disadvantages of this former practice by employing a novel method involving the subjecting of the peeled potatoes to a brief treatment to sulfur dioxide, coupled with refrigeration above the freezing point, and the prevention of the free access of air to the potatoes during transportation and storage and until the potatoes are to be cooked.

The invention will best be understood by reference to the following description of the method, while its scope will be pointed out more particularly in the appended claims.

When potatoes are to be treated, they are peeled in any appropriate manner, as by friction, for example, and they are immediately placed in a vat of plain cold water (the colder the better, so long as above freezing) to exclude air from them while awaiting treatment by the process, because it is usually impossible to process them promptly after peeling as they may accumulate in considerable numbers after peeling and before processing them.

The first step in the process is to immerse the potatoes briefly in a solution containing a reducing agent, such as dilute solution of sulfur dioxide, preferably about 1%, although satisfactory results have been had with concentrations as low as .5% and as high as 6.00%. With concentrations as high as 6.00%, it has been found that a hard jacket forms in the structure of the potatoes and that this remains to some extent after cooking.

While sulfur dioxide, in its gaseous state, is marketed in small tanks and could be released into the water, this mode of handling has been found objectionable because of the fumes released into the air. A convenient and altogether practicable way of making up the bath is to employ sodium bisulfite, a white crystalline powder conveniently soluble in water. One commercial source of sulfur dioxide in a liquid state is Monsanto sulfurous acid 6% availability $SO_2$, a clear, colorless liquid. In any event, the solution is prepared and the concentration checked by an iodine titration test. In fact, the test is repeated from time to time because when the potatoes are transferred from the plain water bath, a small amount of water is brought over into the solution. Also, the strength of the solution is somewhat weakened by evaporation of the sulfur dioxide.

The immersion of the potatoes is brief, and is accomplished conveniently by filling a container such as a basket with potatoes from the plain water bath and immersing the basket and its contents in the solution. To assure access of the solution to the entire surface of each potato, the basket and its contents are shaken to agitate the potatoes. The time of immersion is not at all critical and usually occupies from five to thirty seconds. Longer immersions will do no harm but is unnecessary.

An important accompaniment is the use of refrigeration, because, without refrigeration and at ordinary room temperatures, for example, the coating on the potatoes will pass off very readily. Furthermore, refrigeration prevents or reduces or retards fermentation. Accordingly, the temperature should be maintained as low as possible, yet without freezing (because freezing impairs the potatoes by turning the starch contents "sugary") and although satisfactory results may be had if the temperature is as high as 50° F., to be on the safe side, the potatoes are maintained just above freezing. Also the solution is kept just above freezing to retard evaporation of the sulfur dioxide. One way to accomplish this is by the use of refrigerator coils immersed in the solution.

The third essential is to minimize, so far as possible, the access of air to the potatoes after immersion. To this end, the potatoes, when thus coated and refrigerated, are packed as closely as possible in a closed container which shall limit the effect of the oxygen in the air on the coating which has been applied to the potatoes. One way which I have employed with success is to pack the coated potatoes in paper cartons, which to avoid injury by being wet, are treated as by waxing them. Another and better way of packaging the coated potatoes is to place them in water-resisting bags. An excellent one available for this purpose is made of inner and outer layers of water-resisting parchment (often used as a container for food while cooking, and sold under the trade-name Patapar) with an intervening layer of water-proofing material such as asphalt.

When thus processed and packed, the potatoes are kept in a refrigerated storage room until it is certain that they are thoroughly cold through and through. A sufficient stock is maintained under refrigeration to take care of orders. Deliveries from this stock are made to restaurants and hotels, and upon receipt by the latter should be placed under refrigeration again until the potatoes are to be cooked. Transportation time up to six hours, without refrigeration during transportation, has proven satisfactory and without discoloration, if, after transportation, the potatoes are immediately refrigerated, whereupon they have kept without discoloration over periods ranging from ten to thirty days when maintained under refrigeration between 32° and 50° F.

When the potatoes are cooked, the sulfur dioxide passes off into the air and none is left on or in the potatoes to affect their taste.

Having thus described the process, what I claim and desire by Letters Patent to secure is:

1. The process of preserving peeled white potatoes and preventing discoloration thereof comprising coating the peeled potatoes throughout their exposed peeled portions with an aqueous cooled solution having $SO_2$ in concentration of about .5 to 6.0%, the temperature of the solution being maintained above freezing, enclosing the coated potatoes in a closed container, and maintaining the enclosed contents under refrigeration above freezing.

2. The process of preserving peeled potatoes and preventing discoloration thereof comprising cooling the peeled potatoes, coating the peeled potatoes throughout their exposed peeled portions with an aqueous cooled solution having $SO_2$ in concentration of about .5 to 6.0%, the temperature of the solution being maintained above freezing, enclosing the coated potatoes in a closed container, and maintaining the enclosed contents under refrigeration above freezing.

3. The process of preserving peeled white potatoes and preventing discoloration thereof comprising placing the peeled potatoes in water, coating the peeled potatoes throughout their exposed peeled portions with an aqueous cooled solution having $SO_2$ in concentration of about .5 to 6.0%, the temperature of the solution being maintained above freezing, enclosing the coated potatoes in a closed container, and maintaining the enclosed contents under refrigeration above freezing.

RALPH F. MATARAZZO.

REFERENCES CITED

The following references are of record in the file of this patent:

UNITED STATES PATENTS

| Number | Name | Date |
| --- | --- | --- |
| 2,241,436 | Williams | May 13, 1941 |
| 1,412,523 | Hochstadter | Apr. 11, 1922 |
| 1,948,877 | Draper | Feb. 27, 1934 |
| 2,336,291 | Phillips | Dec. 7, 1943 |
| 2,215,446 | Wilson | Sept. 17, 1940 |
| 2,166,072 | Pope et al. | July 11, 1939 |